US012636678B2

(12) United States Patent
Gignac et al.

(10) Patent No.: US 12,636,678 B2
(45) Date of Patent: May 26, 2026

(54) FIRE SHIELD FOR AN AIRCRAFT ENGINE AND METHOD FOR FORMING SAME

(71) Applicant: Pratt & Whitney Canada Corp., Longueuil (CA)

(72) Inventors: Stephane Gignac, Boucherville (CA); Jason Hamp, Georgetown (CA); Barry Barnett, Markham (CA); Ann-Margaret Porcelli, Kirkland (CA); Jean-Francois Belanger, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 384 days.

(21) Appl. No.: 18/388,697

(22) Filed: Nov. 10, 2023

(65) Prior Publication Data

US 2025/0153215 A1 May 15, 2025

(51) Int. Cl.
*B05D 1/02* (2006.01)

(52) U.S. Cl.
CPC .................................... *B05D 1/02* (2013.01)

(58) Field of Classification Search
CPC ...................................................... B05D 1/02
See application file for complete search history.

(56) References Cited

U.S. PATENT DOCUMENTS

| | | | |
|---|---|---|---|
| 7,255,821 B2 | 8/2007 | Priedeman, Jr. | |
| 10,527,002 B2 | 1/2020 | Hayes | |
| 2012/0037073 A1* | 2/2012 | Linares | B29C 41/08 118/620 |
| 2015/0361899 A1 | 12/2015 | Wong | |
| 2020/0109668 A1 | 4/2020 | Butcher | |
| 2023/0111191 A1* | 4/2023 | Singhal | F02C 7/25 415/200 |

FOREIGN PATENT DOCUMENTS

IT TO20100527 A1 12/2011

OTHER PUBLICATIONS

EP Search Report for EP Patent Application No. 24212242.2 dated Apr. 23, 2025.

* cited by examiner

*Primary Examiner* — Nathan T Leong
(74) *Attorney, Agent, or Firm* — Getz Balich LLC

(57) ABSTRACT

A method for forming a fire shield for an aircraft engine includes forming a case template matching a case body of the fire shield. The case template has a first template side and a second template side. The method further includes forming a fire shield layer at the second template side by spraying a fire shield material at the second template side and attaching the fire shield layer to the case body.

20 Claims, 9 Drawing Sheets

FIRE SHIELD FOR AN AIRCRAFT ENGINE AND METHOD FOR FORMING SAME

TECHNICAL FIELD

This disclosure relates generally to fire shields for aircraft engines and, more particularly, to methods for forming fire shields for aircraft engines.

BACKGROUND OF THE ART

Engines and propulsion systems for aircraft may includes structural components and systems configured for fire resistance, in the unlikely event of an in-flight occurrence of a fire. For example, an aircraft engine may include fire shields configured to protect fire-sensitive components of the engine. Various heat shields and methods for producing heat shields are known in the art. While the known heat shields and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a method for forming a fire shield for an aircraft engine includes forming a case template matching a case body of the fire shield. The case template has a first template side and a second template side. The method further includes forming a fire shield layer at the second template side by spraying a fire shield material at the second template side and attaching the fire shield layer to the case body.

In any of the aspects or embodiments described above and herein, the method may further include applying a release film onto the second template side. Forming the fire shield layer may include spraying the fire shield material onto the release film to form the fire shield layer on the release film.

In any of the aspects or embodiments described above and herein, the method may further include removing the fire shield layer from the release film prior to attaching the fire shield layer to the case body.

In any of the aspects or embodiments described above and herein, the method may further include, prior to removing the fire shield layer from the release film, cutting the case template, the release film, and the fire shield layer into a plurality of pieces. Each piece of the plurality of pieces may include a portion of the case template, a portion of the release film, and a portion of the fire shield layer.

In any of the aspects or embodiments described above and herein, forming the fire shield layer may include spraying the fire shield material directly onto the second template side.

In any of the aspects or embodiments described above and herein, attaching the fire shield layer to the case body includes may include attaching the first template side to the case body with the case template disposed between the case body and the fire shield layer.

In any of the aspects or embodiments described above and herein, the method may further include, prior to attaching the fire shield layer to the case body, cutting the case template and the fire shield layer into a plurality of pieces. Each piece of the plurality of pieces may include a portion of the case template and a portion of the fire shield layer.

In any of the aspects or embodiments described above and herein, forming the case template may include additively manufacturing the case template matching the case body.

In any of the aspects or embodiments described above and herein, the case template may include a polymer material.

In any of the aspects or embodiments described above and herein, the case body may include a body material. The body material may include aluminum or magnesium.

According to another aspect of the present disclosure, a method for forming a fire shield for an aircraft engine includes applying a release film onto a case template, forming a fire shield layer on the case template by applying a fire shield material onto the release film, cutting the case template, the release film, and the fire shield layer into a plurality of pieces. Each piece of the plurality of pieces includes a portion of the case template, a portion of the release film, and a portion of the fire shield layer. The method further includes removing the portion of the fire shield layer from the portion of the release film for each piece of the plurality of pieces and attaching each portion of the fire shield layer onto a case body of the fire shield.

In any of the aspects or embodiments described above and herein, the method may further include forming the case template with a polymer material.

In any of the aspects or embodiments described above and herein, forming the case template may include forming the case template matching the case body.

In any of the aspects or embodiments described above and herein, applying the fire shield material onto the release film may include spraying the fire shield material onto the release film.

In any of the aspects or embodiments described above and herein, applying the release film may include spraying a polytetrafluoroethylene (PTFE)-based release agent onto the case template.

According to another aspect of the present disclosure, a method for forming a fire shield for an aircraft engine includes forming a polymer-material case template matching a metallic case body of the fire shield, forming a fire shield layer on the polymer-material case template by spraying a fire shield material directly onto the polymer-material case template, and attaching the polymer-material case template to the metallic case body with the polymer-material case template disposed between the metallic case body and the fire shield layer.

In any of the aspects or embodiments described above and herein, the method may further include, prior to attaching the fire shield layer to the metallic case body, cutting the polymer-material case template and the fire shield layer into a plurality of pieces. Each piece of the plurality of pieces may include a portion of the polymer-material case template and a portion of the fire shield layer.

In any of the aspects or embodiments described above and herein, attaching the polymer-material case template to the metallic case body may include attaching the portion of the polymer-material case template to the metallic case body for each piece of the plurality of pieces.

In any of the aspects or embodiments described above and herein, the polymer-material case template may include a polyaryletherketone (PAEK) thermoplastic material.

In any of the aspects or embodiments described above and herein, the metallic case body may include a body material. The body material may include an aluminum alloy or a magnesium alloy.

The present disclosure, and all its aspects, embodiments and advantages associated therewith will become more readily apparent in view of the detailed description provided below, including the accompanying drawings.

DETAILED DESCRIPTION

Figure 1:
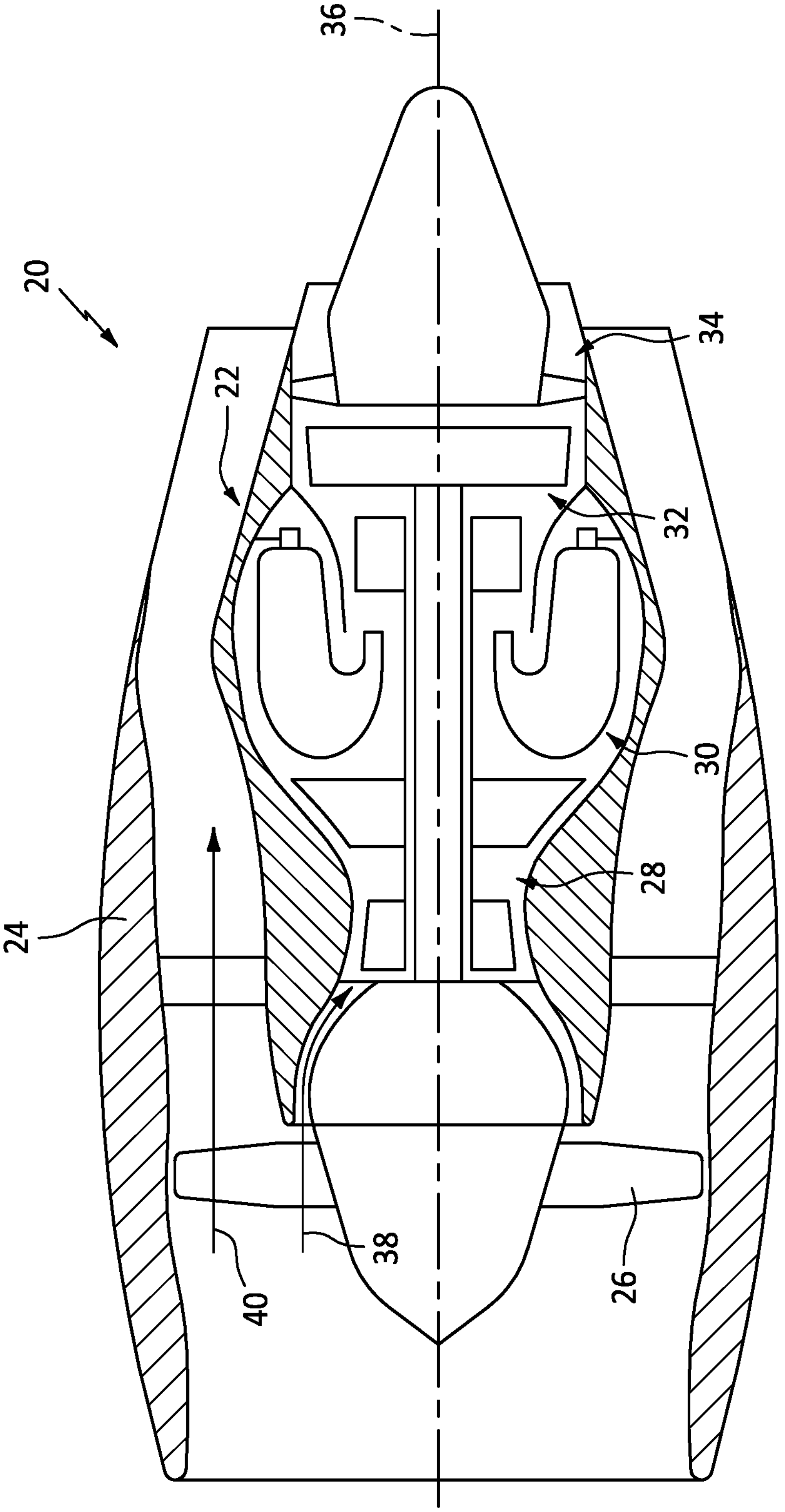
FIG. 1 schematically illustrates a cutaway, side view of propulsion system for an aircraft, in accordance with one or more embodiments of the present disclosure.

FIG. 1 illustrates a propulsion system 20 configured for an aircraft. The propulsion system 20 of FIG. 1 includes a gas turbine engine 22 and a nacelle 24. The gas turbine engine 22 of FIG. 1 is configured as a multi-spool turbofan gas turbine engine. However, while the following description and accompanying drawings may refer to the turbofan gas turbine engine 22 of FIG. 1 as an example, it should be understood that aspects of the present disclosure may be equally applicable to other configurations of gas turbine engines (e.g., a turboshaft gas turbine engine, a turboprop gas turbine engine, a turbojet gas turbine engine, a propfan gas turbine engine, an open rotor gas turbine engine, etc.). Moreover, aspects of the present disclosure may also be equally applicable to other aircraft propulsion system engine configurations (e.g., rotary engines, piston engine, etc.) or to aircraft engines which are independent of aircraft propulsion systems (e.g., an auxiliary power unit (APU)).

The gas turbine engine 22 of FIG. 1 includes a fan 26, a compressor section 28, a combustor section 30, a turbine section 32, and an exhaust section 34 disposed along an axial centerline 36 (e.g., a rotational axis) of the propulsion system 20. In operation, the fan 26 draws and directs ambient air into the propulsion system 20. The air may be divided into a core flow path 38 and a bypass flow path 40. Each of the core flow path 38 and the bypass flow path 40 may be annular flow paths extending circumferentially about (e.g., completely around) the axial centerline 36. The core flow path 38 extends through the propulsion system 20. Air flow along the core flow path 38 is directed through the compressor section 28, the combustor section 30, the turbine section 32, and the exhaust section 34. The compressor section 28 increases the pressure of the air along the core flow path 38 and directs the air into the combustor section 30 where the air mixed with fuel and ignited. The combustion gas resulting from the combusted fuel and air mixture flows through the turbine section 32 causing one or more bladed turbine rotors to rotate and drive one or more rotors (e.g., bladed compressor rotors) of the compressor section 28 and the fan 26 via one or more shafts. Exhaust gas exiting the turbine section 32 is directed out of the gas turbine engine 22 through the exhaust section 34. The bypass flow path 40 extends through the propulsion system 20 outside of the gas turbine engine 22. Air flow along the bypass flow path 40 may be directed through the propulsion system 20 by one or more bypass ducts formed between (e.g., radially between) the gas turbine engine 22 and the nacelle 24.

An aircraft propulsion system or other engine assembly of an aircraft, such as the aircraft propulsion system 20 of FIG. 1, may include a number of components which may be identified as fire-critical components. These fire-critical components may be understood as components which must be protected in the unlikely occurrence of a fire, for example, within the gas turbine engine 22 or the nacelle 24. Examples of fire-critical components may include oil tanks, fuel-oil heat exchangers and other oil coolers, fuel metering systems, temperature-sensitive electrical components, and the like. Some fire-critical components of the propulsion system 20, disposed within fire-risk zones, may be protected by a protective fire cover (e.g., a fire shield). This protective fire cover may be configured to protect one or more fire-critical components such that these fire-critical components, when exposed to a fire, may be able to continue operating or to resist leakage of a hazardous quantity of flammable fluid (e.g., fuel) for a minimum period of time.

Figure 2:
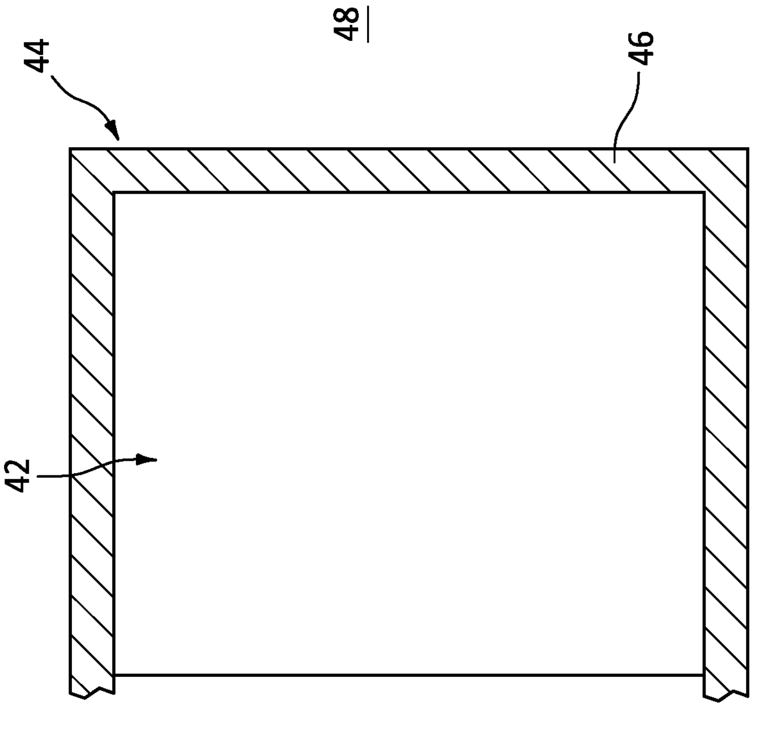
FIG. 2 schematically illustrates a fire-critical component and a fire shield for the propulsion system of FIG. 1, in accordance with one or more embodiments of the present disclosure.

FIG. 2 schematically illustrates a fire-critical component 42 and a fire shield 44 for the fire-critical component 42. The fire shield 44 of FIG. 2 forms a case 46 of the fire-critical component 42. The present disclosure, however, is not limited to the foregoing exemplary configuration of the fire shield 44 of FIG. 2, and the present disclosure fire shield 44 may be any structural body configured to support, house, or otherwise protect a component (e.g., a fire-critical component). The case 46 of FIG. 2 forms an exterior housing of the fire-critical component 42. The fire-critical component 42 is disposed at (e.g., within, adjacent, or proximate) a fire-risk zone 48. The fire shield 44 is positioned relative to the fire-critical component 42 to protect the fire-critical component 42 in the event of a fire in the fire-risk zone 48.

Figure 4:
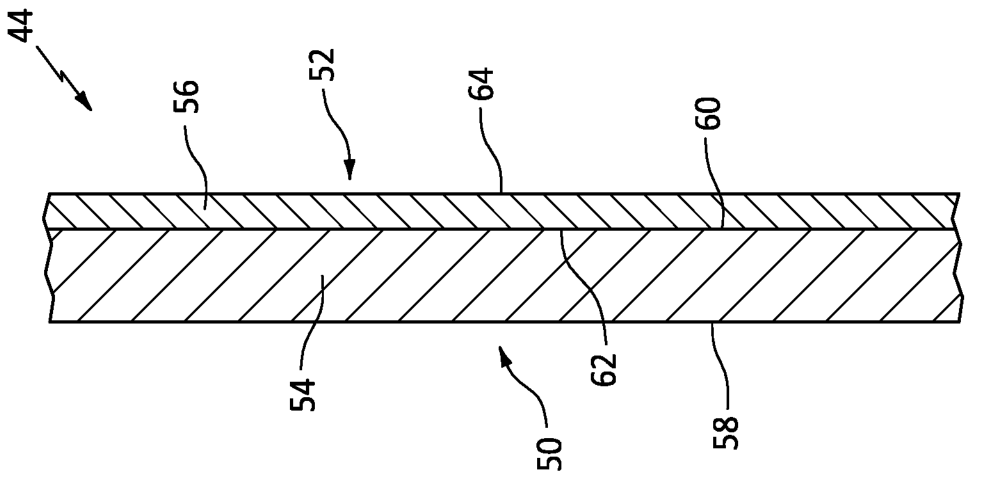
FIG. 4 illustrates a cutaway, side view of a portion of the fire shield of FIG. 3, in accordance with one or more embodiments of the present disclosure.
Figure 3:
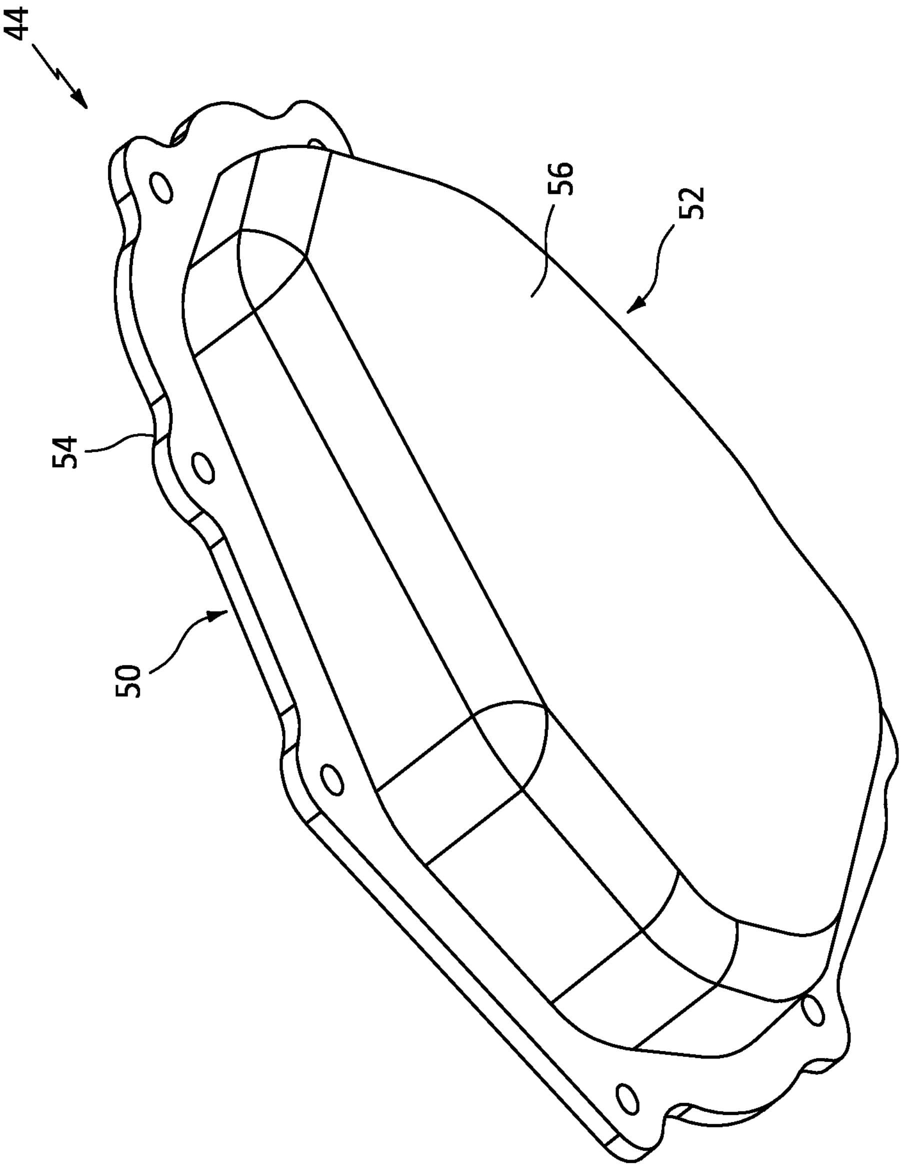
FIG. 3 illustrates a perspective view of a fire shield, in accordance with one or more embodiments of the present disclosure.

FIGS. 3 and 4 illustrate an exemplary configuration of the fire shield 44. FIG. 3 illustrates a perspective view of the fire shield 44. FIG. 4 illustrates a cutaway, side view of the fire shield 44. The fire shield 44 extends between and to an inner side 50 of the fire shield 44 and an outer side 52 of the fire shield 44. The inner side 50 may be disposed at (e.g., on, adjacent, or proximate) and/or facing the fire-critical component 42 (see FIG. 2). The outer side 52 may face away from the fire-critical component 42 and/or be disposed between the inner side 50 and portions of the fire-risk zone 48 coincident with the fire-critical component 42 and its fire shield 44 (see FIG. 2). The fire shield 44 of FIGS. 3 and 4 includes a case body 54 and a fire shield layer 56.

The case body 54 is disposed at (e.g., on, adjacent, or proximate) the inner side 50. For example, the case body 54 may form all or a substantial portion of the inner side 50. The case body 54 of FIG. 4 extends between and to a first case side 58 of the case body 54 and a second case side 60 of the case body 54. The first case side 60 forms the inner side 50. The second case side 60 is disposed coincident with the fire shield layer 56. The case body 54 includes a body material. The body material may form all or a substantial portion of the case body 54. The body material may include a lightweight metal or metal alloy material such as, but not limited to, an aluminum alloy material, a magnesium alloy material, or the like.

The fire shield layer 56 is disposed at (e.g., on, adjacent, or proximate) the outer side 52. For example, the fire shield layer 56 may form all or a substantial portion of the outer side 52. The fire shield layer 56 of FIG. 4 extends between and to a first layer side 62 of the fire shield layer 56 and a second layer side 64 of the fire shield layer 56. The first layer side 62 is disposed coincident with the case body 54. The second layer side 64 forms the outer side 52.

For at least some fire shields, a metallic case or other structural body may not be sufficiently fireproof for aircraft propulsion system or other aircraft engine applications. For example, lightweight metal or metal alloy material cases or structural bodies may not be sufficiently fireproof without additional modifications, which modifications can be expensive and time consuming to perform. Alternative fire shield configurations may be available, but these alternative fire shield configurations also present notable drawbacks. For example, high-temperature resistant metallic fire shields may be heavy and expensive, particularly where they are configured to facilitate protection of fire-sensitive components having complex geometric surfaces and shapes. Fire blankets may also be used to protect fire-sensitive components. However, conventional fire blankets can be cumbersome and difficult to securely attach to fixed structures of an aircraft propulsion system or other aircraft engine.

Figure 5:
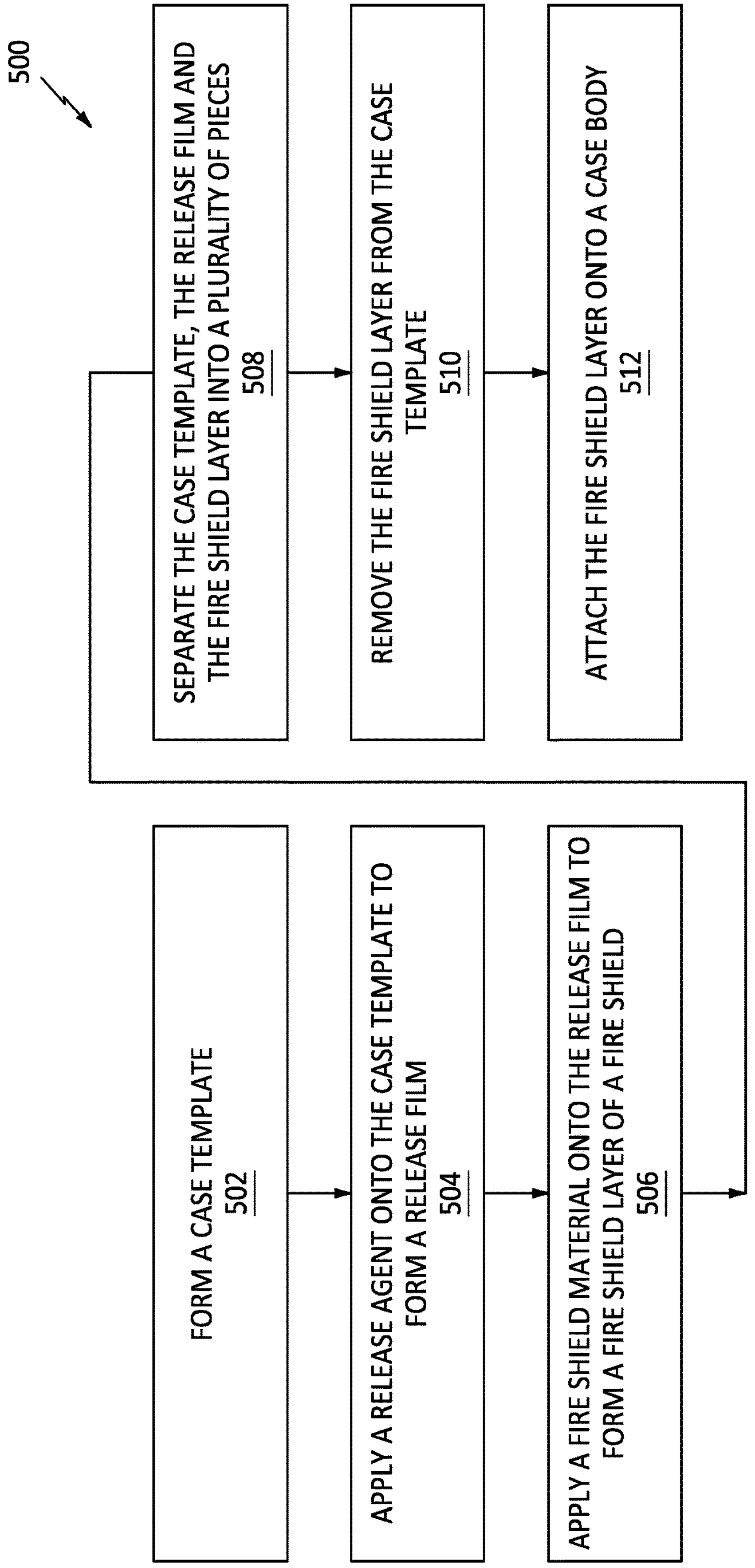
FIG. 5 illustrates a block diagram depicting a method for forming a fire shield, in accordance with one or more embodiments of the present disclosure.

Referring to FIGS. 5-9, a method 500 for forming a fire shield, such as the shield 44, is provided. FIG. 5 illustrates a flowchart for the method 500. The method 500 will be described herein with respect to the fire shield 44. However, it should be understood that the method 500 is not limited to use with the particular fire shield 44 described herein. Unless otherwise noted herein, it should be understood that the steps of method 500 are not required to be performed in the specific sequence in which they are discussed below and, in some embodiments, the steps of method 500 may be performed separately or simultaneously.

Figure 6:
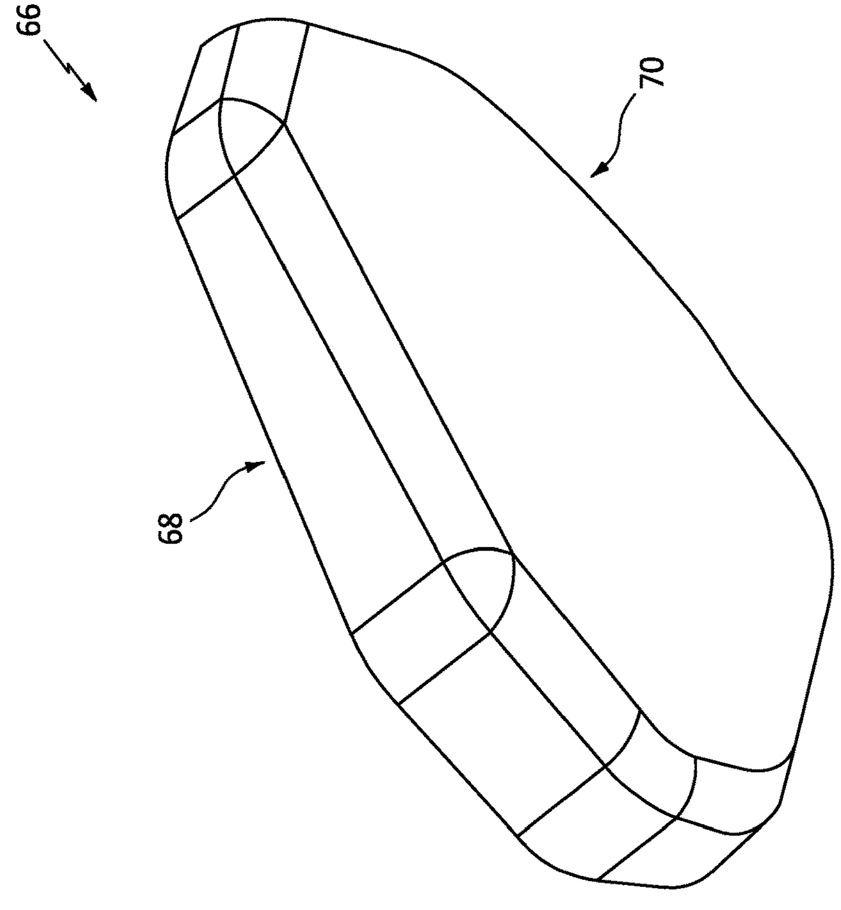
FIG. 6 illustrates a perspective view of a case template for a case body of the fire shield, in accordance with one or more embodiments of the present disclosure.

Step 502 includes forming a three-dimensional (3D) case template 66 of the case body 54. FIG. 6 illustrates a perspective view of the case template 66. The case template 66 extends between and to a first template side 68 of the case template 66 and a second template side 70 of the case template 66. The case template 66 is formed with a size, shape, curvature, and/or other geometric characteristics which matches (e.g., is the same as or substantially the same as, within manufacturing tolerances) all or a substantial portion of the case body 54. For example, the second template side 70 may have a size, shape, curvature, and/or other geometric characteristics which matches the second case side 60 of the case body 54. Alternatively, the case template 66 may be formed to match a portion of the case body 54. For example, step 502 may include forming a plurality of different case templates 66 with each case template 66 matching a different portion of the case body 54. The case template 66 includes a template material. The template material may form all or a substantial portion of the case template 66. The template material may include a polymer material such as, but not limited to, a thermoplastic material, a thermoset material, an elastomeric material, or the like. The case template 66 may be formed with the polymer material, for example, using an additive manufacturing process, an injection molding process, a compression molding process, or another suitable manufacturing process.

Step 504 includes applying a release agent onto the case template 66 (e.g., the second template side 70) to form a release film 72 on the case template 66 (e.g., the second template side 70). The release agent may be a polytetrafluoroethylene (PTFE)-based release agent such as, for example, those sold under the MCLUBE trademark (McGee Industries, Inc.; Aston, Pennsylvania). The present disclosure, however, is not limited to any particular release agent for forming the release film 72, and any suitable release agent may be used to facilitate separation of the fire shield layer 56 from the case template 66, as will be discussed in further detail.

Figure 7:
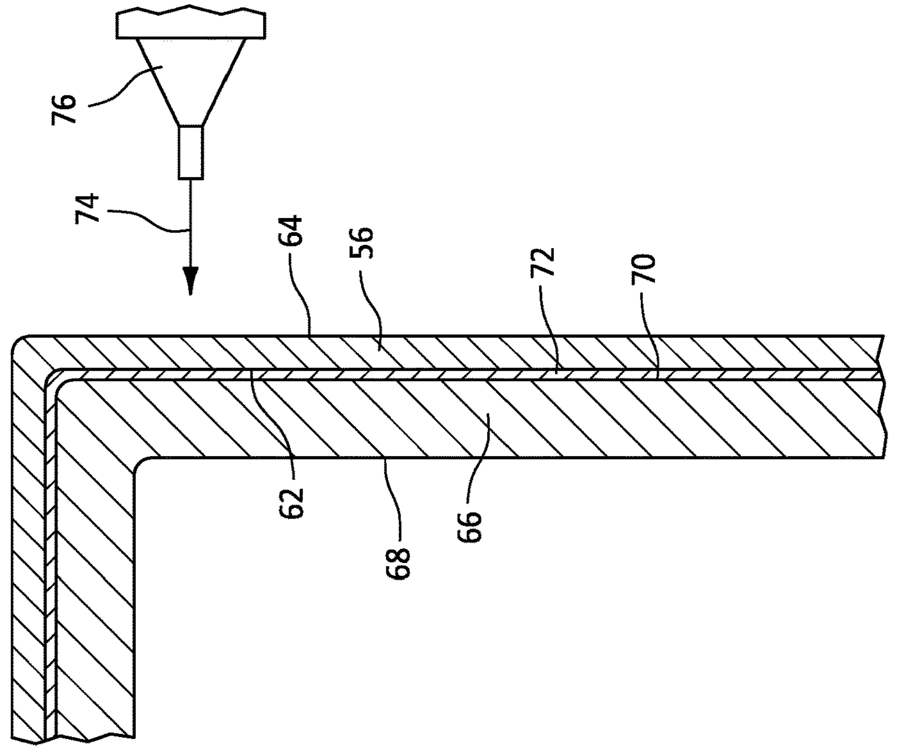
FIG. 7 illustrates a cutaway, side view of a fire shield layer disposed on the case template of FIG. 6, in accordance with one or more embodiments of the present disclosure.

Step 506 includes forming the fire shield layer 56 on the case template 66 by applying a fire shield material onto the release film 72. As shown in FIG. 7, for example, the fire shield layer 56 is formed on the case template 66 with the release film 72 disposed between the case template 66 (e.g., the second template side 70) and the fire shield layer 56. The fire shield material may be applied onto the release film 72, for example, by spraying a liquid fire shield material 74 onto the release film 72 using a spray nozzle 76 of a spray coating assembly (e.g., a thermal spray coating assembly). The present disclosure, however, is not limited to any particular process for applying the fire shield material onto the release film 72. The fire shield material may include an ablative material or other fireproofing material such as, but not limited to, a filled elastomeric silicone ablative material, which can be applied onto the release film 72 to form the fire shield layer 56. Forming the fire shield layer 56 on the case template 66 may include applying a curing process (e.g., a thermal curing process) to the fire shield material disposed on the release film 72. Alternatively, the fire shield material may be configured for curing at room temperature.

Figure 8:
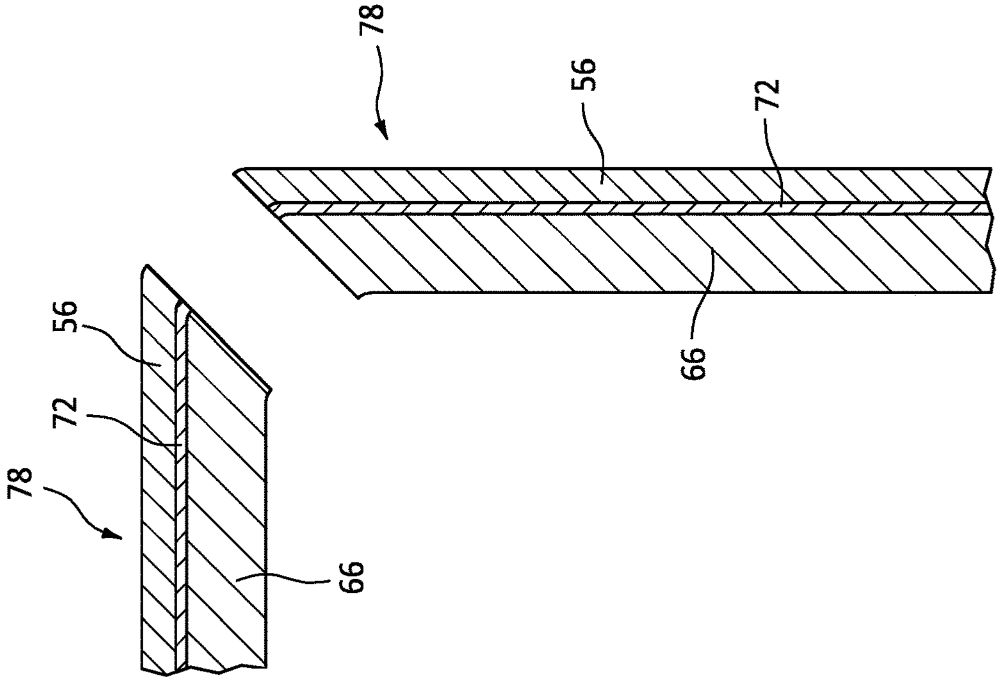
FIG. 8 illustrates a cutaway, side view of the fire shield layer and the case template of FIG. 7 in a plurality of pieces, in accordance with one or more embodiments of the present disclosure.

Step 508 includes, optionally, cutting or otherwise separating the case template 66, the release film 72, and the fire shield layer 56 into a plurality of pieces 78. As shown in FIG. 8, for example, each of the pieces 78 may include a portion of the case template 66, a portion of the release film 72, and a portion of the fire shield layer 56, with the portions assembled together. Separation of the case template 66, the release film 72, and the fire shield layer 56 into the pieces 78 may facilitate removal of the fire shield layer 56 from the case template 66 and application of the fire shield layer 56 onto the case body 54 (e.g., the second case side 60), particularly where the case body 54 may include complex curvatures or other geometric characteristics making application of all or large portions of the fire shield layer 56 onto the case body 54 more difficult.

Step 510 includes removing the fire shield layer 56 (e.g., the cured fire shield layer 56; see step 506) from the case template 66. For example, the fire shield layer 56 may be separated from the release film 72 by pulling the fire shield layer 56 away from the release film 72. Removal of the fire shield layer 56 may include removing each portion of the fire shield layer 56 for each respective one of the pieces 78.

Figure 9:
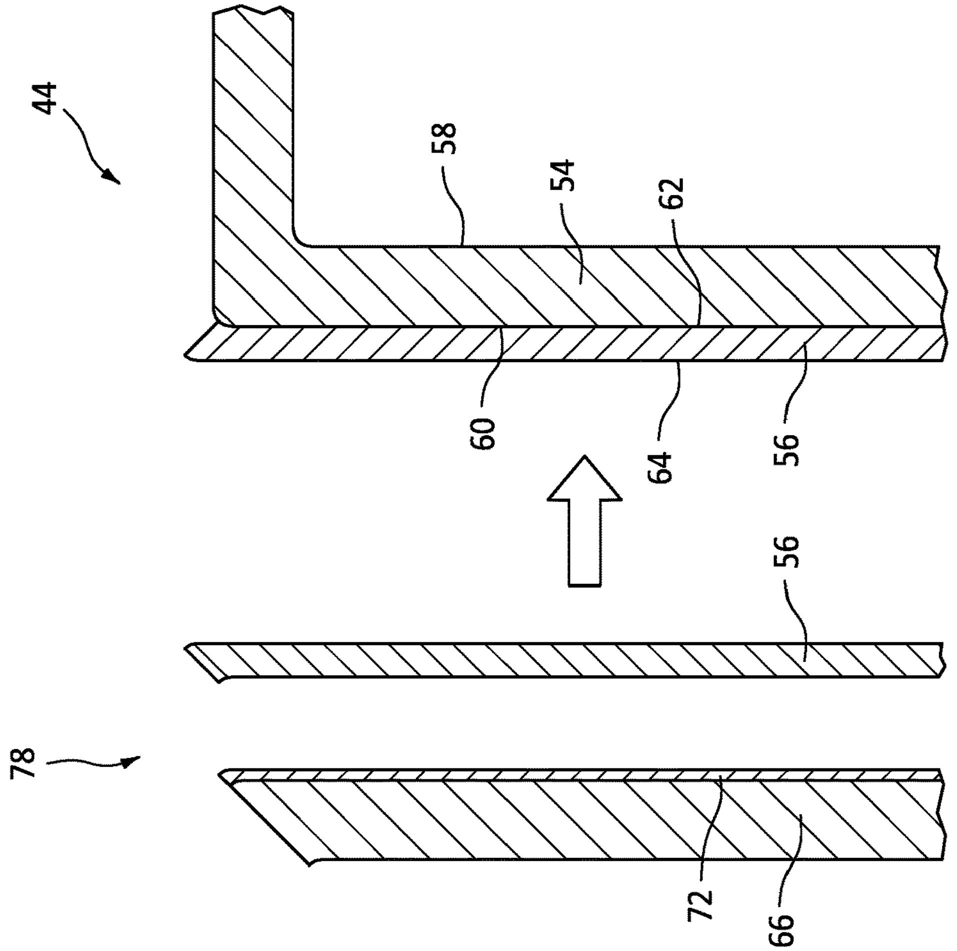
FIG. 9 illustrates a cutaway, side view of the case template, the fire shield layer, and a case body depicting a removal of the fire shield layer from the case template and an application of the fire shield layer to the case body, in accordance with one or more embodiments of the present disclosure.

Step 512 includes attaching the fire shield layer 56 onto the case body 54 (e.g., the second case side 58) as shown, for example, in FIG. 9. Attaching the fire shield layer 56 onto the case body 54 may include attaching each portion of the fire shield layer 56 to the case body 54 (e.g., the second case side 58) for each respective one of the pieces 78. The fire shield layer 56 may be attached to the case body 54, for example, using an adhesive (e.g., a high-temperature adhesive) or another suitable bonding agent.

Figure 10:
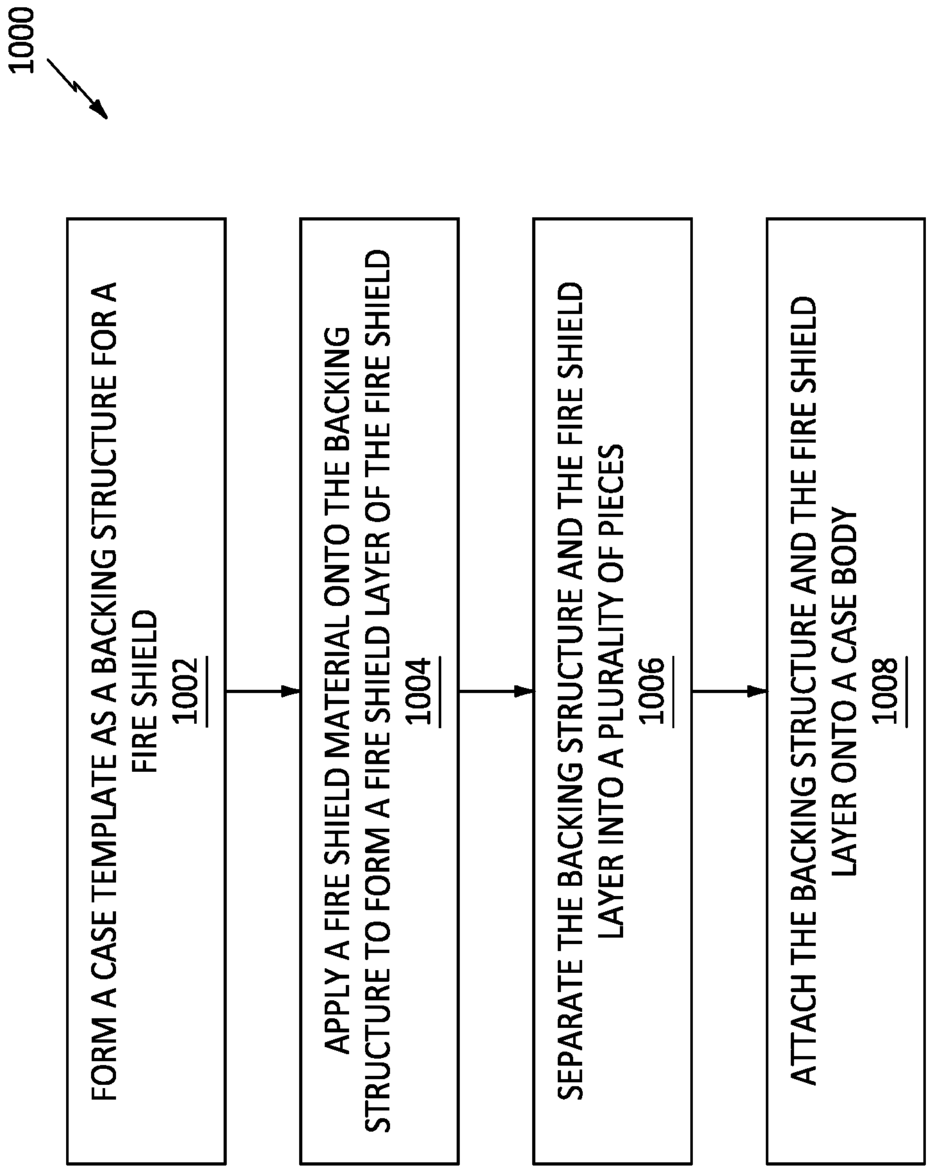
FIG. 10 illustrates a block diagram depicting another method for forming a fire shield, in accordance with one or more embodiments of the present disclosure.

Referring to FIGS. 10-14, another method 1000 for forming a fire shield, such as the shield 44, is provided. FIG. 10 illustrates a flowchart for the method 1000. The method 1000 will be described herein with respect to the fire shield 44. However, it should be understood that the method 1000 is not limited to use with the particular fire shield 44 described herein. Unless otherwise noted herein, it should be understood that the steps of method 1000 are not required to be performed in the specific sequence in which they are discussed below and, in some embodiments, the steps of method 1000 may be performed separately or simultaneously.

Figure 11:
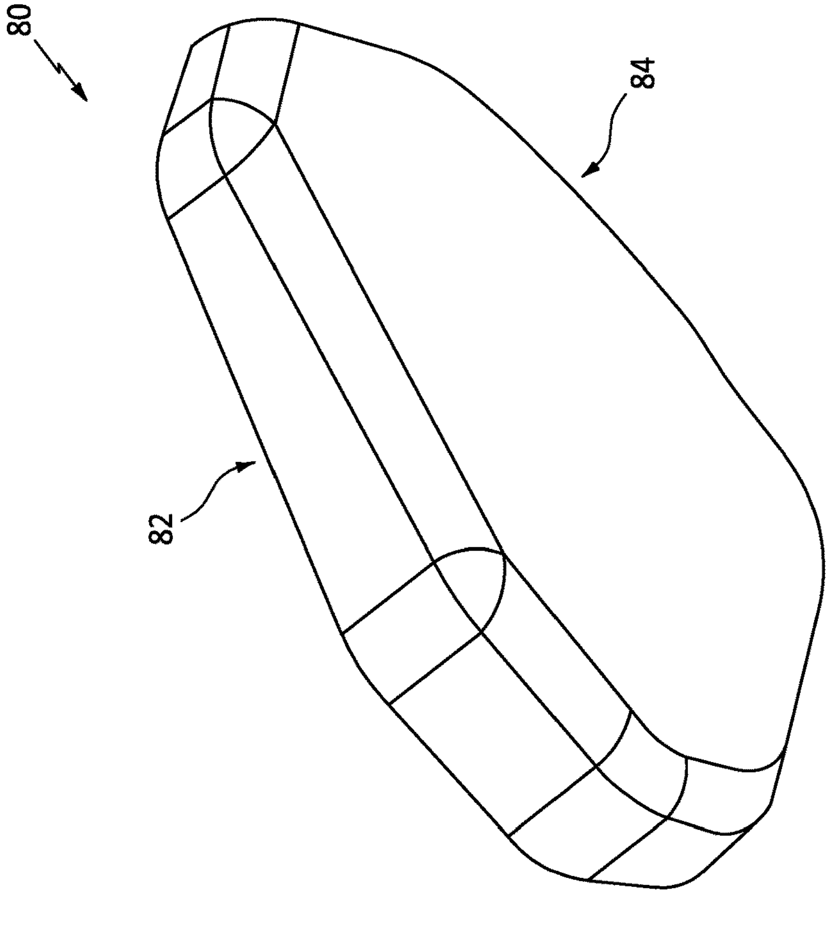
FIG. 11 illustrates a perspective view of a case template for a case body of the fire shield, in accordance with one or more embodiments of the present disclosure.

Step 1002 includes forming a three-dimensional (3D) case template 80 of the case body 54 as a backing structure 90 for the fire shield 44. FIG. 11 illustrates a perspective view of the case template 80. The backing structure 90 extends between and to the first template side 82 of the case template 80 and a second template side 84 of the case template 80. The backing structure 90 is formed with a size, shape, curvature, and/or other geometric characteristics which matches (e.g., is the same as or substantially the same as, within manufacturing tolerances) all or a substantial portion of the case body 54. For example, the first template side 82 may have a size, shape, curvature, and/or other geometric characteristics which matches the second case side 60 of the case body 54. Alternatively, the backing structure 90 may be formed to match a portion of the case body 54. For example, step 1002 may include forming a plurality of different backing structures 90 with each backing structure 90 matching a different portion of the case body 54. The backing structure 90 includes a template material. The template material may form all or a substantial portion of the backing structure 90. The template material may include a polymer material such as, but not limited to, a thermoplastic material, a thermoset material, an elastomeric material, or the like. In particular, the template material of the backing structure 90 may have high temperature stability and high heat resistance characteristics such as those found in polyaryletherketone (PAEK) thermoplastics including, but not limited to, polyether ether ketone (PEEK) and polyetherketoneketone (PEKK). The backing structure 90 may be formed with the polymer material, for example, using an additive manufacturing process, an injection molding process, a compression molding process, or another suitable manufacturing process.

Figure 12:
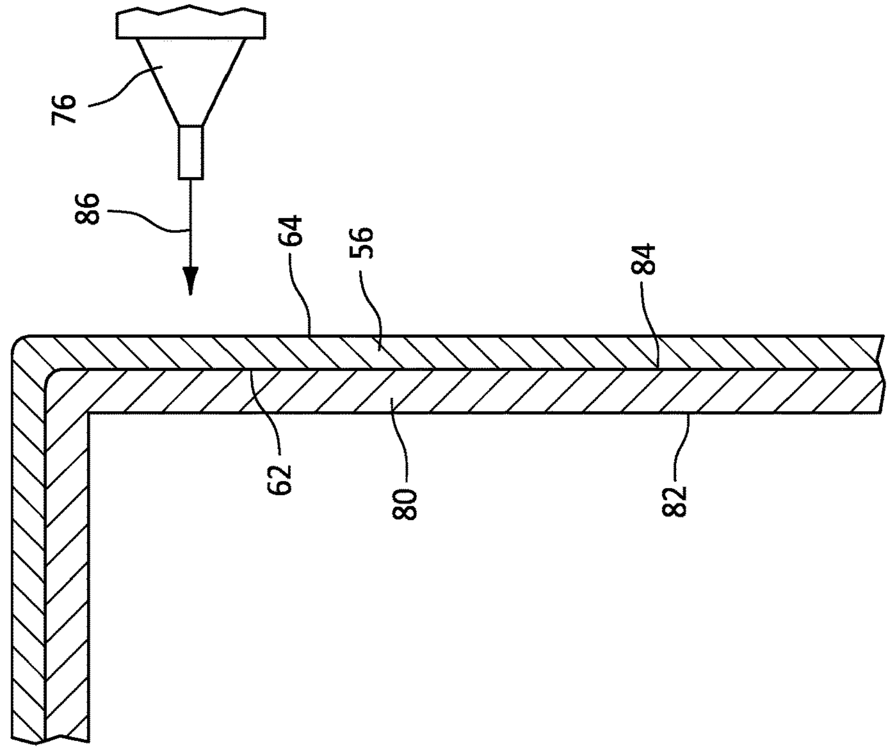
FIG. 12 illustrates a cutaway, side view of a fire shield layer disposed on the case template of FIG. 11, in accordance with one or more embodiments of the present disclosure.

Step 1004 includes forming the fire shield layer 56 on the backing structure 90 by applying a fire shield material onto (e.g., directly onto) the backing structure 90 (e.g., the second template side 84). As shown in FIG. 12, the fire shield material may be applied onto the backing structure 90, for example, by spraying a liquid fire shield material 86 onto the backing structure 90 using the spray nozzle 76. The present disclosure, however, is not limited to any particular process for applying the fire shield material onto the backing structure 90. The fire shield material may include an ablative material or other fireproofing material such as, but not limited to, a filled elastomeric silicone ablative material, which can be applied onto the backing structure 90 to form the fire shield layer 56. Forming the fire shield layer 56 on the backing structure 90 may include applying a curing process (e.g., a thermal curing process) to the fire shield material disposed on the backing structure 90. Alternatively, the fire shield material may be configured for curing at room temperature.

Figure 13:
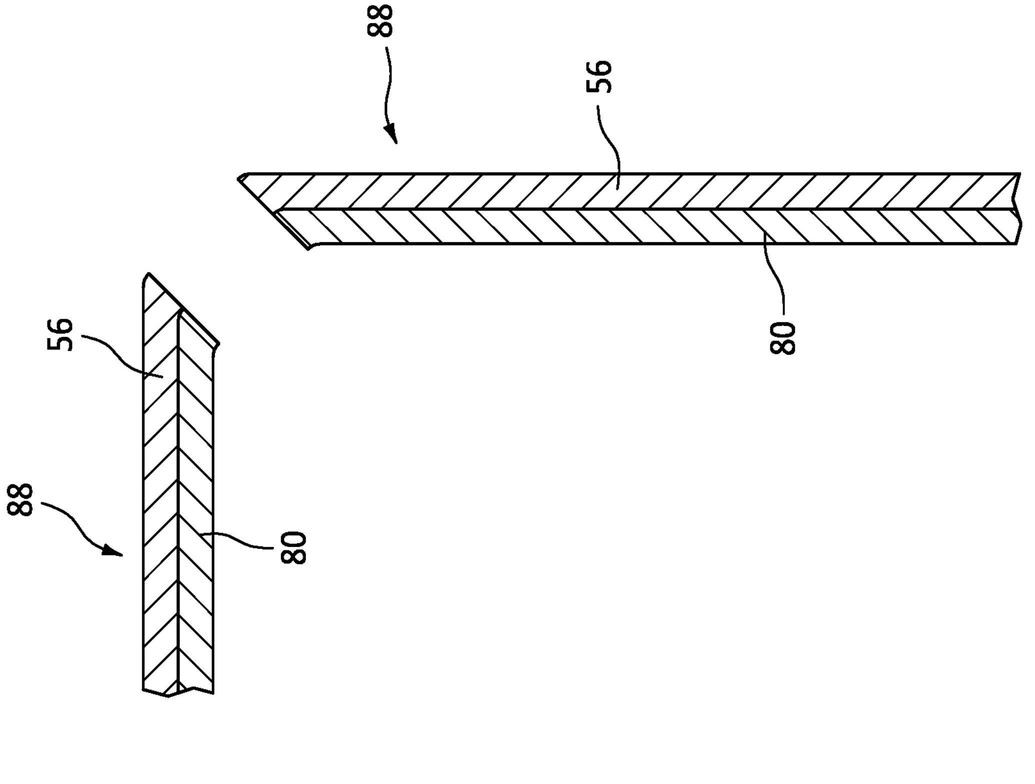
FIG. 13 illustrates a cutaway, side view of the fire shield layer and the case template of FIG. 12 in a plurality of pieces, in accordance with one or more embodiments of the present disclosure.

Step 1006 includes, optionally, cutting or otherwise separating the backing structure 90 and the fire shield layer 56 into a plurality of pieces 88. As shown in FIG. 13, for example, each of the pieces 88 may include a portion of the backing structure 90 and a portion of the fire shield layer 56, with the portions assembled together. Separation of the backing structure 90 and the fire shield layer 56 into the pieces 88 may facilitate attachment of the fire shield layer 56 onto the case body 54 (e.g., the second case side 60), particularly where the case body 54 may include complex curvatures or other geometric characteristics making application of all or large portions of the fire shield layer 56 onto the case body 54 more difficult.

Figure 14:
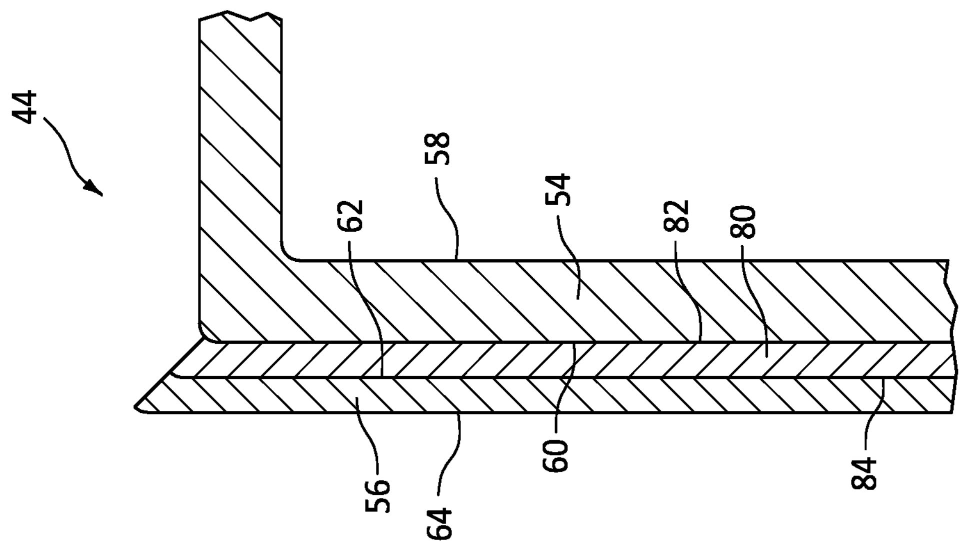
FIG. 14 illustrates a cutaway, side view of the case template, the fire shield layer, and a case body depicting an application of the case template and the fire shield layer to the case body, in accordance with one or more embodiments of the present disclosure.

Step 1008 includes attaching the backing structure 90 and the fire shield layer 56, assembled together, onto the case body 54 (e.g., the second case side 58) as shown, for example, in FIG. 14. The first template side 82 of the backing structure 90 may be attached to the second case side 60 of the case body 54, such that the backing structure 90 is disposed between the case body 54 and the fire shield layer 56. Attaching the backing structure 90 and the fire shield layer 56 onto the case body 54 may include attaching each of the pieces 88 to the case body 54. The backing structure 90 and the fire shield layer 56 may be attached to the case body 54, for example, using an adhesive (e.g., a high-temperature adhesive) or another suitable bonding agent. Alternatively, the backing structure 90 and the fire shield layer 56 may be mounted onto the case body 54, for example, using one or more mechanical fasteners or other mounting configurations. The attachment of the backing structure 90 (e.g., the case template 80) to the case body 54 with the fire shield layer 56 facilitates attachment of the fire shield layer 56 to the case body 54 where the fire shield layer 56 may not possess sufficient stiffness and/or strength for unsupported handling and removal of the fire shield layer 56 from the backing structure 90 and/or attachment to the case body 54, for example, with mechanical fasteners (see steps 510 and 512).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for forming a fire shield for an aircraft engine, the method comprising:

forming a case template matching a case body of the fire shield, and the case template has a first template side and a second template side;

forming a fire shield layer at the second template side by spraying a fire shield material at the second template side; and attaching the fire shield layer to the case body.

2. The method of claim 1, further comprising applying a release film onto the second template side, wherein forming the fire shield layer includes spraying the fire shield material onto the release film to form the fire shield layer on the release film.

3. The method of claim 2, further comprising removing the fire shield layer from the release film prior to attaching the fire shield layer to the case body.

4. The method of claim 3, further comprising, prior to removing the fire shield layer from the release film, cutting the case template, the release film, and the fire shield layer into a plurality of pieces, and each piece of the plurality of pieces includes a portion of the case template, a portion of the release film, and a portion of the fire shield layer.

5. The method of claim 1, wherein forming the fire shield layer includes spraying the fire shield material directly onto the second template side.

6. The method of claim 5, wherein attaching the fire shield layer to the case body includes attaching the first template side to the case body with the case template disposed between the case body and the fire shield layer.

7. The method of claim 6, further comprising, prior to attaching the fire shield layer to the case body, cutting the case template and the fire shield layer into a plurality of pieces, and each piece of the plurality of pieces includes a portion of the case template and a portion of the fire shield layer.

8. The method of claim 1, wherein forming the case template includes additively manufacturing the case template matching the case body.

9. The method of claim 1, wherein the case template includes a polymer material.

10. The method of claim 1, wherein the case body includes a body material, and the body material includes aluminum or magnesium.

11. A method for forming a fire shield for an aircraft engine, the method comprising:

applying a release film onto a case template;

forming a fire shield layer on the case template by applying a fire shield material onto the release film;

cutting the case template, the release film, and the fire shield layer into a plurality of pieces, and each piece of the plurality of pieces includes a portion of the case template, a portion of the release film, and a portion of the fire shield layer;

removing the portion of the fire shield layer from the portion of the release film for each piece of the plurality of pieces; and attaching each portion of the fire shield layer onto a case body of the fire shield.

12. The method of claim 11, further comprising forming the case template with a polymer material.

13. The method of claim 12, wherein forming the case template includes forming the case template matching the case body.

14. The method of claim 11, wherein applying the fire shield material onto the release film includes spraying the fire shield material onto the release film.

15. The method of claim 11, wherein applying the release film includes spraying a polytetrafluoroethylene (PTFE)-based release agent onto the case template.

16. A method for forming a fire shield for an aircraft engine, the method comprising:

forming a polymer-material case template matching a metallic case body of the fire shield;

forming a fire shield layer on the polymer-material case template by spraying a fire shield material directly onto the polymer-material case template; and attaching the polymer-material case template to the metallic case body with the polymer-material case template disposed between the metallic case body and the fire shield layer.

17. The method of claim 16, further comprising, prior to attaching the fire shield layer to the metallic case body, cutting the polymer-material case template and the fire shield layer into a plurality of pieces, and each piece of the plurality of pieces includes a portion of the polymer-material case template and a portion of the fire shield layer.

18. The method of claim 17, wherein attaching the polymer-material case template to the metallic case body includes attaching the portion of the polymer-material case template to the metallic case body for each piece of the plurality of pieces.

19. The method of claim 16, wherein the polymer-material case template includes a polyaryletherketone (PAEK) thermoplastic material.

20. The method of claim 16, wherein the metallic case body includes a body material, and the body material includes an aluminum alloy or a magnesium alloy.

* * * * *